United States Patent [19]

Underwood

[11] 4,241,878
[45] Dec. 30, 1980

[54] NOZZLE AND PROCESS
[75] Inventor: Gene E. Underwood, Casper, Wyo.
[73] Assignee: 3U Partners, Casper, Wyo.
[21] Appl. No.: 15,292
[22] Filed: Feb. 26, 1979
[51] Int. Cl.³ .............................................. B05B 1/06
[52] U.S. Cl. .................................... 239/591; 239/600;
239/602; 264/267; 264/274; 285/291
[58] Field of Search ............... 239/589, 590, 591, 600,
239/602, DIG. 19; 285/289, 290, 291, 175, 92;
264/267, 269, 274; 222/95; 151/7

[56] References Cited
U.S. PATENT DOCUMENTS

| 839,947 | 1/1907 | McCluskey | 285/289 |
|---|---|---|---|
| 1,654,265 | 12/1927 | Leins | 239/589 |
| 3,633,467 | 1/1972 | Watanabe et al. | 264/269 |
| 3,938,709 | 2/1976 | Collar | 222/95 |

FOREIGN PATENT DOCUMENTS

| 1283705 | 12/1961 | France | 264/274 |
|---|---|---|---|
| 1542847 | 3/1979 | United Kingdom | 285/92 |

Primary Examiner—Johnny D. Cherry
Assistant Examiner—Michael J. Forman
Attorney, Agent, or Firm—Wofford, Fails & Zobal

[57] ABSTRACT

A nozzle comprising an elastic member molded in a conduit having oppositely disposed threads at opposite ends. The elastic member embeds all of the threads at the down stream end, a portion of the threads at the up stream end and extends out of the down stream end defining a discharge end. An aperture extends through the elastic member and is conical shaped at the discharge end thereof.

26 Claims, 4 Drawing Figures

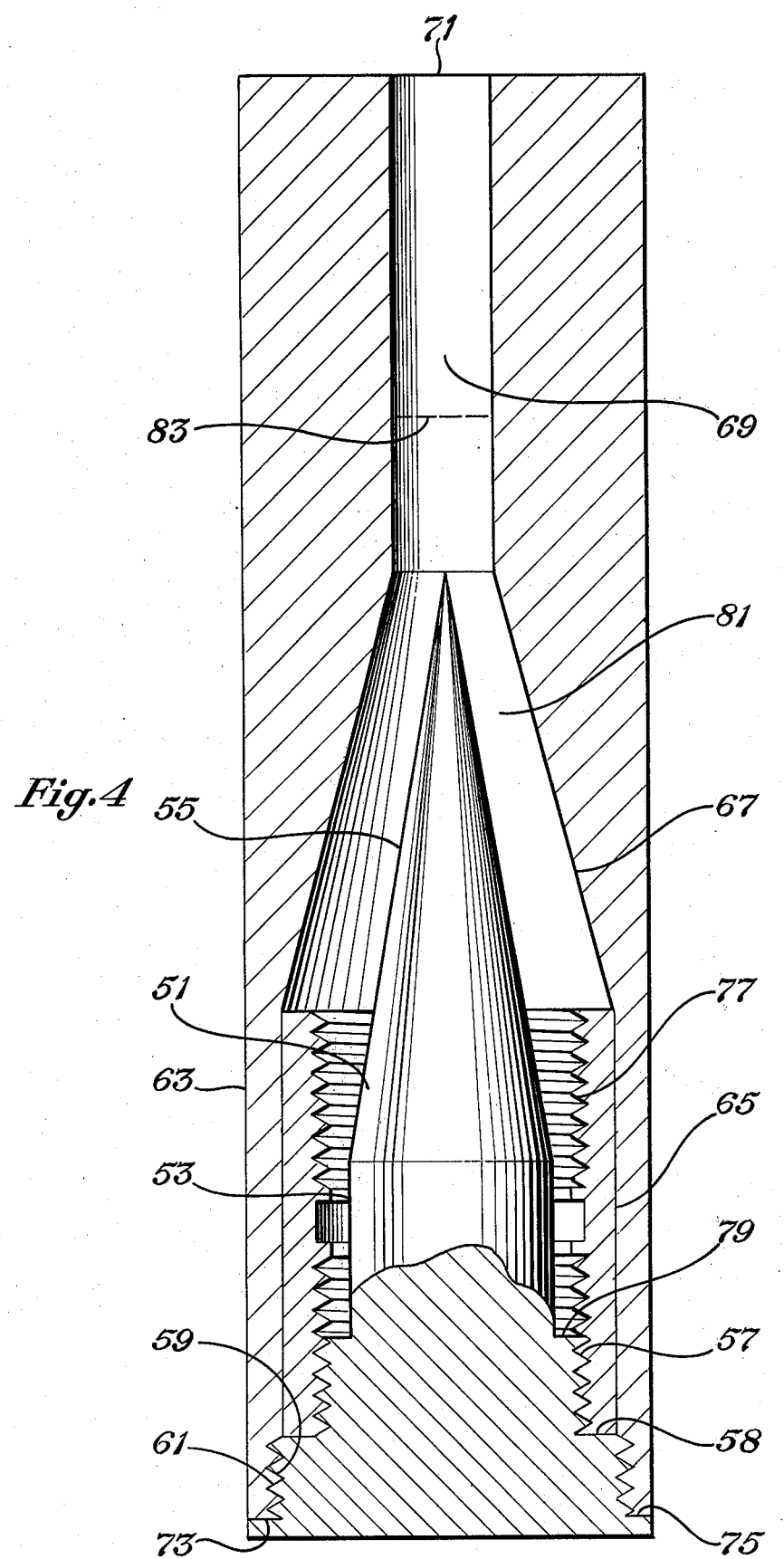

NOZZLE AND PROCESS

BACKGROUND OF THE INVENTION

1. Field of the Invention

The present invention relates to a nozzle or more particularly to a nozzle for use for discharging abrasive fluids.

2. Description of the Prior Art

In the oil field or drilling industry, expensive steel nozzles are used for mixing drilling fluid. In most cases, the drilling fluid is highly abrasive which results in a very short life for the steel nozzles. Thus, a need exists for a longer wearing less expensive nozzle.

SUMMARY OF THE INVENTION

It is an object of the present invention to provide a longer wearing less expensive nozzle than those heretofore known to the invention.

It is another object of the present invention to provide a nozzle which comprises an elastic member molded into a conduit.

It is a further object of the present invention to provide an unique process of forming a nozzle.

BRIEF DESCRIPTION OF THE DRAWINGS

FIG. 4 illustrates the mold for forming the blank of FIG. 3.

DESCRIPTION OF THE PREFERRED EMBODIMENTS

Figure 1:
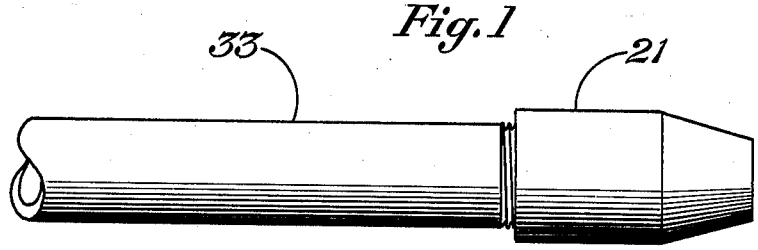
FIG. 1 is a side view of the nozzle of the present invention threaded to the end of a pipe.
Figure 2:
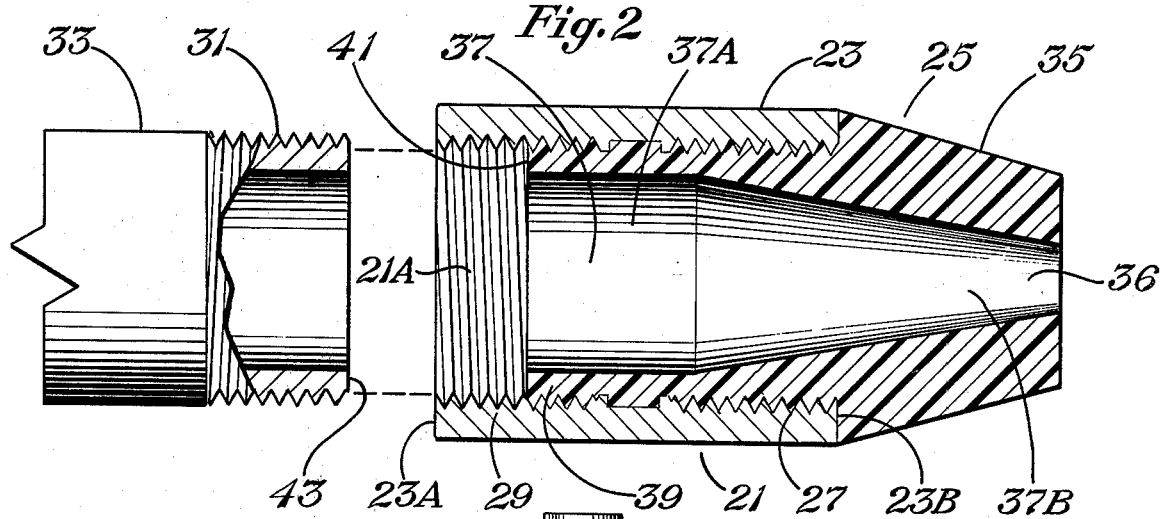
FIG. 2 is a cross sectional view of the nozzle of FIG. 1 detached from the pipe.

Referring now to FIGS. 1 and 2, the nozzle of the present invention is identified by reference numeral 21. It comprises a threaded metal pipe coupling or conduit 23 having an elastic member 25 molded therein. The coupling 23 has oppositely disposed threads 27 and 29 formed on the inside at opposite ends thereof. By "oppositely disposed" is meant that when viewing the nozzle from one of its ends, one set of threads are formed in a clockwise direction and the other set formed in a counter clockwise direction. The elastic member 25 embeds all of the threads 27 at the down stream end and a portion of the threads 29 at the up stream end, leaving the remaining portion of the threads 29 exposed to be threaded to mating male threads 31 formed on conduit or pipe 33. The elastic member 25 has a discharge end 35 extending out of the conduit 23. An aperture 37 extends through the member 25 from its up stream end 39 to its discharge or down stream end 35. The aperture 37 comprises a cylindrical shaped portion 37A and a conical shaped portion 37B at its discharge end.

In use, the threads 29 of nozzle 21 are threaded to the threads 31 of pipe 33 and fluid is injected from pipe 33 through the nozzle 21 for the purposes desired. The inside diameter of the up stream end 39 of the elastic member 25 is the same as the inside diameter of pipe 33 whereby the inside surface of the end 39 of member 25 is flush with the inside surface of pipe 33. When the nozzle 21 is threaded to pipe 33, end surface 41 of member 25 will be engaged by end surface 43 of pipe 33 and be compressed to form a seal between the two end surfaces. The pressure provided by the working fluid flowing through the nozzle also will compress the elastic member against the nozzle conduit 23 and will result in additional sealing force between end surfaces 41 and 43.

As indicated above, the threads 27 and 29 are oppositely disposed. Since the elastic member 25 embeds threads 27 and a portion of threads 29, the elastic member is locked in place and cannot be dislodged either by unthreading or by the force of the fluid injected through the nozzle.

The elastic member 25 is formed of a highly abrasive resistant elastomer which preferably is a polyurethane. Such material has much better wearing qualities to abrasive fluids than does steel. It is has been found that the present nozzle having its elastic member 25 formed of polyurethane or other highly abrasive resistance elastomers will last much longer than a steel nozzle when employed for use for mixing abrasive drilling fluids. The inside surface of member 25 has a very smooth finish which provides a high coefficient of discharge. Moreover, the nozzle 21 is formed of inexpensive materials and is simple to construct and hence is less expensive than a steel nozzle.

Figure 3:
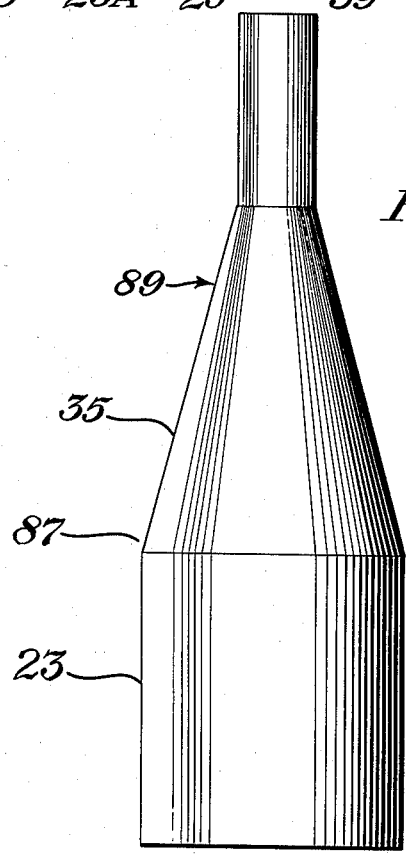
FIG. 3 is a side view of the blank from which the nozzle of FIG. 2 is formed.

Referring also to FIGS. 3 and 4, there will be described the method of producing the nozzle 21. In the construction process, a core 51 is used having a lower cylindrical portion 53 and an upper conical shaped portion 55 which defines the shape of the aperture 37. The core 51 has upper threads 57 which mate with threads 29 of the nozzle conduit 23; a lower shoulder 58 for engaging the lower end 23A of the conduit 23 and in addition lower threads 29 which mate with threads 61 of the mold 63. The mold 63 has a lower inner cylindrical surface 65 for receiving the conduit 23; an upper conical shaped inner surface 67 adapted to receive the conical end 55 of the core 51; and a small upper cylindrical shaped aperture 69 leading to an upper opening 71. In operation, threads 57 of core 51 are threaded into threads 29 of the conduit 23 until shoulder 58 engages the lower end of nozzle conduit 23. The mold 63 is fitted around the conduit 23 with the core 51 in place and threads 61 threaded to threads 59 of core 51 until the lower end 73 of mold 63 abutts against shoulder 75 of core 51.

In the position of the core and mold shown in FIG. 4, an annulus 77 is formed between the inside of the conduit 23 and the core surfaces 53 and 55 down to the lower level defined by shoulder 79 of core 51 which forms the bottom of the annulus. It is noted that the shoulder or bottom 79 as shown in FIG. 4 is located between the upper and lower ends of upstream threads 29 of conduit 23. An annulus 81 also is formed between the inside surface 67 of the mold 63 and the conical shaped end 55 of the core. Although not shown, a fitting having a small central opening is inserted in opening 71 through which liquid polyurethane is poured to obtain a stream smaller in diameter than aperture 69 and concentric with the walls of aperture 69. The fitting has air passages formed between its outer wall and the inner wall of aperture 69. The small stream of liquid polyurethane flows as a film downward and around core 53. When the film reaches shoulder 79 the annulus 77 is filled from the bottom up displacing air. As the liquid level reaches annulus 81, it also is filled from the bottom up, displacing air. When the liquid reaches a level indicated by dotted line 83, the flow of polyurethane is stopped. In the process, no air is trapped in the polyurethane thereby preventing the formation of air bubbles in the resulting elastic member 25. The mold then is placed in an oven for curing purposes. After the polyurethane has partially cured, the core 51 is unthreaded from the conduit 23 and from mold 63 to obtain the blank 87 shown in FIG. 3. It has the threaded upstream opening 21A and aperture 37 extending upward from end surface 41 to the position where the point of core 55 extends conforming to the shape of the core 51. The blank is placed in the oven for final curing. After final curing, the top portion of the blank is severed at a position desired, for example, at 89, as shown in FIG. 3 to form the discharge opening 36 of the nozzle. If a larger opening is desired, the blank will be severed at a lower position. It could even be severed at the end 23B of conduit 23.

As indicated above, the polyurethane embeds threads 27 and a portion of the oppositely disposed threads 29 which together act to lock the elastic member in place. If desired, circumferential ribs could be formed on the inside of conduit 23 in lieu of threads 27 for locking purposes. It is to be understood that other types of locking means may be used. In addition, the conduit 23 may have other forms, for example, it could be a T-shaped member with its right angle opening plugged.

In one embodiment, the nozzle 21 may be used for the nozzles employed in the fluid mixing system described and claimed in my co-pending U.S. Patent application Ser. No. 810,590, filed June 27, 1977.

In order to form a nozzle for said blasting purposes, the shape of the core 51 used in the process will have a cylindrical section 53, a conical shaped portion conforming with the shape of a portion of cone 55, a smaller cylindrical shaped portion terminating in a cone tip. The purpose of the cone tip is to form the liquid polyurethane film around the core as it is poured. After curing and removal of the core and mold, the blank will be severed at level of the resulting smaller cylindrical shaped portion of the aperture whereby the aperture formed through the elastic member will have a shape similar to the exterior shape of the blank of FIG. 3.

What is claimed is:

1. A nozzle for discharging a fluid, comprising:
a conduit having internal threads formed on the inside thereof at opposite ends,
said threads formed at said opposite ends being oppositely disposed,
an elastic member molded in said conduit,
said elastic member extending from one end of said conduit to an up stream position spaced inward from the other end of said conduit embedding said threads at said one end and a portion of said threads at said other end leaving the remaining portion of said threads at said other end exposed to allow said other end of said conduit to be threaded to mating external threads of a second conduit,
said elastic member having an aperture formed therethrough from said up stream position to a discharge end for the discharge of fluid,
the cross-sectional area of said aperture at said discharge end being smaller than the cross-sectional area of said aperture at said up stream position.
2. The nozzle of claim 1 wherein:
the up stream end of said elastic member comprises an annular surface to be engaged by the end of said second conduit when it is threaded into said other end of said conduit of said nozzle.
3. The nozzle of claim 1 wherein:
said elastic member has a conical shaped inside surface leading to said discharge end.
4. The nozzle of claim 3 wherein:
said discharge end of said elastic member extends out of said one end of said conduit.
5. The nozzle of claim 3, wherein:
the inside of said elastic member from the maximum diameter of said conical shaped surface to said upstream position is cylindrical in shape,
said threads at said one end of said conduit extend to the edge of said conduit at said one end,
the minimum inside diameter of said conduit is generally the same throughout its length.
6. The nozzle of claim 1 wherein said discharge end of said elastic member extends out of said one end of said conduit.
7. The nozzle of claim 1, wherein:
said threads at said one end of said conduit extend to the edge of said conduit at said one end.
8. A nozzle for discharging a fluid, comprising:
a conduit having internal threads formed on the inside thereof at least at an upstream end,
an elastic member molded in said conduit,
said conduit having locking means formed on the inside thereof at a position downstream of said threads for locking said elastic member to said conduit,
said elastic member extending from the down stream end of said conduit to an upstream position spaced inward from said upstream end of said conduit embedding said locking means and at least a portion of said threads leaving the remaining portion of said threads exposed to allow said upstream end of said conduit to be threaded to mating external threads of a second conduit,
said elastic member having an opening formed therethrough from said upstream position to a discharge end for the discharge of fluid,
the cross-sectional area of said aperture at said discharge end being smaller than the cross-sectional area of said aperture at said upstream end.
9. The nozzle of claim 8 wherein:
said up stream end of said elastic member comprises an annular surface to be engaged by the end of said second conduit when it is threaded into said up stream end of said conduit of said nozzle.
10. The nozzle of claim 9 wherein:
said discharge end of said elastic member extends out of said down stream end of said conduit.
11. The nozzle of claim 8 wherein:
said elastic member has a conical shaped inside surface leading to said discharge end.
12. The nozzle of claims 3 or 11, wherein:
the inside of said elastic member from the maximum diameter of said conical shaped surface to said upstream position is cylindrical in shape.
13. The nozzle of claim 8 wherein:
said discharge end of said elastic member extends out of said down stream end of said conduit.
14. The nozzle of claim 8, wherein:
said locking means comprises means extending inward from the wall of said conduit and having opposite sides engaged by the material of said elastic member.
15. The nozzle of claims 1 or 8, wherein:
the minimum inside diameter of said conduit is generally the same throughout its length.

16. A blank for forming a nozzle for discharging a fluid, comprising:
- a conduit having internal threads formed on the inside thereof at opposite ends,
- said threads formed at said opposite ends being oppositely disposed,
- an electric member molded in said conduit and having an exterior portion extending out of one end of said conduit,
- said elastic member extending from said one end of said conduit to an up stream position spaced inward from the other end of said conduit embedding said threads at said one end and a portion of said threads at said other end leaving the remaining portion of said threads at said other end exposed to allow said other end of said conduit to be threaded to mating external threads of a second conduit, and
- an aperture formed into said elastic member from its up stream end to a point in said exterior portion extending out of said one end of said conduit such that the end of said aperture in said exterior portion is closed,
- said aperture being conical shaped in said exterior portion of said elastic member extending out of said one end of said conduit,
- the material of said elastic member being characterized such that said exterior portion may be severed at different positions along its length to form an opening for said aperture having a cross sectional area dependent upon the position where said exterior portion is severed.

17. The blank of claim 16 wherein:
the upstream end of said elastic member comprises an annular surface to be engaged by the end of said second conduit when it is threaded into said other end of said conduit in which said elastic member is molded.

18. The blank of claim 16, wherein:
said threads at said one end of said conduit extend to the edge of said conduit at said one end.

19. The blank of claim 16, wherein:
said aperture of said elastic member from the maximum diameter of said conical shaped portion of said upstream position is cylindrical in shape,
said threads at said one end of said conduit extend to the edge of said conduit at said one end,
the minimum inside diameter of said conduit is generally the same throughout its length.

20. A blank for forming a nozzle for discharging a fluid, comprising:
- a conduit having internal threads formed on the inside thereof at least at an upstream end,
- an elastic member molded in said conduit and having an exterior portion extending out of a downstream end of said conduit,
- said conduit having locking means formed on the inside thereof at a position downstream of said threads for locking said elastic member to said conduit,
- said elastic member extending from the downstream end of said conduit to an upstream position spaced inward from said upstream end of said conduit embedding said locking means and leaving at least a portion of said threads leaving the remaining portion of said threads exposed to allow said upstream end of said conduit to be threaded to mating external threads of a second conduit, and
- an aperture formed into said elastic member from its upstream end to a point in said exterior portion extending out of said downstream end of said conduit such that the end of said aperture in said exterior portion of said elastic member is closed,
- said aperture being conical shaped in said exterior portion of said resilient member extending out of said downstream end of said conduit,
- the material of said elastic member being characterized such that said exterior portion may be severed at different positions along its length to form an opening for said aperture having a cross sectional area dependent upon the position where said exterior portion is severed.

21. The blank of claim 20 wherein:
the upstream end of said elastic member comprises an annular surface to be engaged by the end of said second conduit when it is threaded into said conduit in which said elastic member is molded.

22. The blank of claim 20, wherein:
said locking means comprises means extending inward from the wall of said conduit and having opposite sides engaged by the material of said elastic member.

23. The blank of claims 16 or 20, wherein:
the minimum inside diameter of said conduit is generally the same throughout its length.

24. The blank of claims 16 or 20, wherein:
said aperture of said elastic member from the maximum diameter of said conical shaped portion to said upstream position is cylindrical in shape.

25. A nozzle for discharging a fluid, comprising:
- a conduit having internal threads formed on the inside thereof at least at an upstream end,
- an elastic member molded in said conduit,
- said conduit having locking means formed on the inside thereof and extending inward from the wall of said conduit for locking said elastic member to said conduit,
- said elastic member extending from the down stream end of said conduit to an upstream position spaced inward from said upstream end of said conduit embedding said locking means,
- said threads allowing said upstream end of said conduit to be threaded to mating external threads of a second conduit,
- said elastic member having an opening formed therethrough from said upstream position to a discharge end for the discharge of fluid,
- the cross-sectional area of said aperture at said discharge end being smaller than the cross-sectional area of said aperture at said upstream end.

26. The nozzle of claim 25, wherein:
said locking means has opposite sides engaged by the material of said elastic member.

* * * * *